United States Patent
Aykin

(10) Patent No.: US 8,332,249 B1
(45) Date of Patent: Dec. 11, 2012

(54) SYSTEM AND METHOD FOR INTEGRATED SUPPLY CHAIN AND CONTACT CENTER MANAGEMENT

(75) Inventor: Turgut Aykin, Atlantic Highlands, NJ (US)

(73) Assignee: Turgut Aykin, Hazlet, NJ (US)

( * ) Notice: Subject to any disclaimer, the term of this patent is extended or adjusted under 35 U.S.C. 154(b) by 0 days.

(21) Appl. No.: 13/135,562

(22) Filed: Jul. 8, 2011

Related U.S. Application Data

(63) Continuation-in-part of application No. 12/584,210, filed on Sep. 2, 2009, which is a continuation-in-part of application No. 10/614,483, filed on Jul. 7, 2003, now Pat. No. 7,725,339, which is a continuation-in-part of application No. 13/066,774, filed on Apr. 25, 2011, and a continuation-in-part of application No. 13/068,274, filed on May 6, 2011.

(51) Int. Cl.
*G06Q 10/00* (2012.01)

(52) U.S. Cl. ............... 705/7.11; 705/7.12; 705/7.13; 705/7.14; 705/7.22

(58) Field of Classification Search .................. None
See application file for complete search history.

(56) References Cited

U.S. PATENT DOCUMENTS

| | | | | |
|---|---|---|---|---|
| 5,216,593 | A * | 6/1993 | Dietrich et al. | 345/467 |
| 6,002,863 | A * | 12/1999 | Sheer et al. | 703/22 |
| 6,044,355 | A * | 3/2000 | Crockett et al. | 705/7.39 |
| 6,192,122 | B1 * | 2/2001 | Flockhart et al. | 379/266.01 |
| 6,563,920 | B1 * | 5/2003 | Flockhart et al. | 379/265.1 |
| 6,581,027 | B1 * | 6/2003 | Sheer et al. | 703/9 |
| 6,622,134 | B1 * | 9/2003 | Sorkin | 706/20 |
| 6,744,877 | B1 * | 6/2004 | Edwards | 379/265.02 |
| 6,766,012 | B1 * | 7/2004 | Crossley | 379/265.02 |
| 6,831,966 | B1 * | 12/2004 | Tegan et al. | 379/88.16 |
| 6,856,680 | B2 * | 2/2005 | Mengshoel et al. | 379/265.06 |
| 6,970,829 | B1 * | 11/2005 | Leamon | 705/7.14 |
| 7,249,047 | B2 * | 7/2007 | Arguello et al. | 705/7.14 |
| 7,451,098 | B2 * | 11/2008 | Ingman et al. | 705/7.14 |
| 7,478,051 | B2 * | 1/2009 | Nourbakhsh et al. | 705/7.37 |

(Continued)

OTHER PUBLICATIONS

Cezik, M.T, and P. L'Ecuyer, "Staffing Multiskill Call Centers via Linear Programming and Simulation," Management Science, Feb. 2008 54(2), 310-323.*

(Continued)

*Primary Examiner* — Lynda Jasmin
*Assistant Examiner* — Brett Feeney

(57) ABSTRACT

The present invention provides a method and system for integrated supply chain and contact center planning. First, the system and method of the invention obtains forecasts of contacts expected, average handling times, agent shrinkage and sales ratios with and without backorders over a planning period. The method and system of the invention next schedules agents to minimize lost sales, agent, facility, and communication costs for contact groups used by customers to order products, and to best meet productivity-based targets for contact groups used for services not for sale. Using the scheduled staffing levels, and forecasts of contact volumes, average handling times, agent shrinkage, sales ratios with and without backorders, supply chain product availability, and a staffing model, the method and system of the invention generates product sales forecasts for products sold. Product sales forecasts thus generated are inputted into the demand planning and forecasting process of the integrated supply chain management system. Contact center based product sales forecasts are combined with the product sales forecasts received from other supply chain sales channels to generate combined product sales forecasts based on which inventory, supply, and distribution planning steps of supply chain management are carried out.

7 Claims, 5 Drawing Sheets

U.S. PATENT DOCUMENTS

| | | | |
|---|---|---|---|
| 7,725,339 B1* | 5/2010 | Aykin | 705/7.14 |
| 2004/0054564 A1* | 3/2004 | Fonseca et al. | 705/7 |
| 2004/0111311 A1* | 6/2004 | Ingman et al. | 705/9 |
| 2006/0112049 A1* | 5/2006 | Mehrotra et al. | 706/46 |
| 2007/0121897 A1* | 5/2007 | Patakula et al. | 379/265.05 |
| 2007/0129996 A1* | 6/2007 | Babine et al. | 705/11 |

OTHER PUBLICATIONS

Bhulai, S., G. Koole, and A. Pot, "Simple Methods for Shift Scheduling in Multiskill Call Centers," Manufacturing & Service Operations Management, Summer 2008 10(3), 411-420.*

* cited by examiner

| Date/Time | AOD Scheduled | NCO Forecast | NCH Forecast | AHT Forecast (sec) | SL% Forecast | ASA (sec) Forecast | Occupancy Level (%) Forecast | Ab% Forecast | Product A Sales Forecast | Product B Sales Forecast | Product C Sales Forecast |
|---|---|---|---|---|---|---|---|---|---|---|---|
| 10/25/09 9:00 | 138 | 198 | 196 | 381 | 81.5 | 9.5 | 92.0 | 1.0 | 20 | 49 | 23 |
| 10/25/09 9:15 | 140 | 200 | 198 | 381 | 81.5 | 9.5 | 92.1 | 1.0 | 20 | 49 | 24 |
| 10/25/09 9:30 | 166 | 227 | 225 | 403 | 80.0 | 10.3 | 93.2 | 1.1 | 23 | 56 | 27 |
| 10/25/09 9:45 | 169 | 229 | 227 | 404 | 82.2 | 9.0 | 92.8 | 1.0 | 23 | 57 | 27 |
| 10/25/09 10:00 | 188 | 247 | 244 | 421 | 80.2 | 10.3 | 93.6 | 1.1 | 25 | 61 | 29 |
| 10/25/09 10:15 | 191 | 250 | 248 | 420 | 81.5 | 9.4 | 93.4 | 1.0 | 25 | 62 | 30 |
| 10/25/09 10:30 | 189 | 261 | 258 | 401 | 81.4 | 9.3 | 93.5 | 1.0 | 26 | 65 | 31 |
| 10/25/09 10:45 | 191 | 263 | 260 | 401 | 81.3 | 9.3 | 93.5 | 1.0 | 26 | 65 | 31 |
| 10/25/09 11:00 | 223 | 316 | 313 | 394 | 80.9 | 9.5 | 94.3 | 1.0 | 32 | 78 | 38 |
| 10/25/09 11:15 | 225 | 318 | 315 | 394 | 80.6 | 9.7 | 94.4 | 1.0 | 32 | 79 | 38 |
| 10/25/09 11:30 | 229 | 311 | 308 | 411 | 80.9 | 9.5 | 94.4 | 1.0 | 31 | 77 | 37 |
| 10/25/09 11:45 | 232 | 315 | 312 | 411 | 81.1 | 9.5 | 94.4 | 1.0 | 32 | 78 | 37 |
| 10/25/09 12:00 | 249 | 331 | 328 | 422 | 80.3 | 9.8 | 94.8 | 1.0 | 33 | 82 | 39 |
| 10/25/09 12:15 | 252 | 334 | 331 | 422 | 81.8 | 8.9 | 94.5 | 0.9 | 33 | 83 | 40 |
| 10/25/09 12:30 | 248 | 342 | 338 | 406 | 80.2 | 9.9 | 94.8 | 1.0 | 34 | 85 | 41 |
| 10/25/09 12:45 | 251 | 345 | 342 | 406 | 81.8 | 9.0 | 94.6 | 0.9 | 34 | 85 | 41 |
| 10/25/09 13:00 | 262 | 357 | 354 | 410 | 81.5 | 9.2 | 94.8 | 0.9 | 36 | 88 | 42 |
| 10/25/09 13:15 | 263 | 360 | 356 | 410 | 80.6 | 9.6 | 95.0 | 1.0 | 36 | 89 | 43 |
| 10/25/09 13:30 | 291 | 374 | 370 | 436 | 81.8 | 8.9 | 95.0 | 0.9 | 37 | 93 | 44 |
| 10/25/09 13:45 | 292 | 376 | 373 | 436 | 81.4 | 9.1 | 95.1 | 0.9 | 38 | 93 | 45 |
| 10/25/09 14:00 | 282 | 359 | 355 | 440 | 81.1 | 9.5 | 95.0 | 1.0 | 36 | 89 | 43 |
| 10/25/09 14:15 | 285 | 362 | 359 | 440 | 82.3 | 8.7 | 94.8 | 0.9 | 36 | 90 | 43 |
| 10/25/09 14:30 | 271 | 362 | 358 | 419 | 82.3 | 8.7 | 94.7 | 0.9 | 36 | 90 | 43 |
| 10/25/09 14:45 | 272 | 364 | 361 | 419 | 82.0 | 8.8 | 94.8 | 0.9 | 36 | 90 | 43 |
| 10/25/09 15:00 | 266 | 350 | 347 | 425 | 82.4 | 8.7 | 94.6 | 0.9 | 35 | 87 | 42 |
| 10/25/09 15:15 | 268 | 353 | 349 | 425 | 81.3 | 9.2 | 94.8 | 1.0 | 35 | 87 | 42 |
| 10/25/09 15:30 | 260 | 349 | 346 | 416 | 82.5 | 8.6 | 94.5 | 0.9 | 35 | 86 | 42 |
| 10/25/09 15:45 | 262 | 352 | 349 | 416 | 81.2 | 9.4 | 94.8 | 1.0 | 35 | 87 | 42 |
| 10/25/09 16:00 | 254 | 335 | 331 | 425 | 80.3 | 9.8 | 94.8 | 1.0 | 33 | 83 | 40 |

FIG. 4.

SYSTEM AND METHOD FOR INTEGRATED SUPPLY CHAIN AND CONTACT CENTER MANAGEMENT

RELATED APPLICATION

This application is a continuation in part of and claims the benefit of priority of co-pending U.S. patent application Ser. No. 12/584,210 filed on Sep. 2, 2009, which is a continuation in part of U.S. patent application Ser. No. 10/614,483, filed Jul. 7, 2003, now U.S. Pat. No. 7,725,339. This application also claims priority co-pending U.S. patent application Ser. No. 13/066,774 filed Apr. 25, 2011 and co-pending U.S. patent application Ser. No. 13/068,274 filed May 6, 2011, both of which are continuation in part applications of and claims the benefit of priority of co-pending U.S. patent application Ser. No. 12/584,210 filed on Aug. 31, 2009. All of the aforementioned applications are fully incorporated herein by reference in their entirety.

REFERENCES CITED

U.S. Patent Documents

| | | | |
|---|---|---|---|
| 5,953,707 | September, 1999 | Huang et al. | 705/10 |
| 6,816,839 | November, 2004 | Gung et al. | 705/10 |
| 7,080,026 | July, 2006 | Singh et al. | 705/10 |
| 7,130,807 | October, 2006 | Mikurak | 705/10 |
| 7,324,966 | January, 2008 | Scheer | 705/28 |
| 7,707,149 | April, 2010 | Lee et al., | 707/10 |
| 7,725,339 | May, 2010 | Aykin | 705/7.14 |
| 2004/0028212 | February, 2004 | Lok et al. | 379/265.09 |
| 2005/0288993 | December, 2005 | Weng et al. | 705/7.31 |
| 2006/0271422 | November, 2006 | Rakesh et al. | 705/7.24 |
| 2007/0016467 | January, 2007 | John et al. | 705/7.31 |
| 10/614,483 | July, 2003 | Aykin | |
| 11/446,711 | June 2006 | Aykin | |
| 12/584,210 | August, 2009 | Aykin | |
| 13/066,774 | April, 2011 | Aykin | |

Other References

Box, G. E. P., G. M. Jenkins, and G. C. Reinsel, *Time Series Analysis: Forecasting and Control,* $3^{rd}$ ed., Prentice-Hall, Englewood Cliff, N.J., 1994.

Law, A. M., and W. D. Kelton, *Simulation Modeling and Analysis,* $3^{rd}$ ed., McGraw Hill, 2000.

Makridakis, S., S. C. Wheelwright, and R. J. Hyndman, *Forecasting: Methods and Applications,* $3^{rd}$ ed., John Wiley & Sons, New York, 1998.

Palm C. (1957), "Research on telephone traffic carried by full availability groups," *Tele,* v.1, 107. (English translation— the original paper was first published in 1946 in Swedish in the same journal, which was entitled, at the time, *Tekniska Meddelanden fran Kungl. Telegrafstyrelsen.*)

FIELD OF THE INVENTION

This invention relates generally to integrated supply chain and contact center management and, more particularly, relates to a method for demand planning in an integrated supply chain and contact center system.

BACKGROUND OF THE INVENTION

In order to succeed in today's highly competitive environment, organizations have to improve their costs, speed, efficiency, and customer experience in delivering their products and services. Recent success stories in supply chain management (SCM) showed that organizations adopting successful SCM processes and practices to improve their performance in these areas can gain significant advantages over their competitors.

With the advances in communication and internet technologies, new direct marketing and sales channels have grown more popular among customers over the past two decades. Contact centers, web sites, and social media are among the new direct marketing and sales channels currently used by organizations. More traditional sales channels include direct sales teams, stores, dealerships, and channel partners. Besides price advantages, the convenience of being able to shop wherever and whenever they choose to is an attractive feature that customers are now expecting in buying products and services.

These new channels are different in nature than more traditional sales channels such as direct sales teams and in-store sales in that the new sales channels usually involve processes that are traditionally not considered among the SCM processes. Processes needed for the management of these new sales channels, however, affect sales, and the orders received by a supply chain.

In successful organizations, sales teams as well as stores are connected with the rest of the supply chain. Direct sales channels such as contact centers and web sites are also a part of the extended supply chain and their planning needs to be coordinated with the planning of the entire supply chain.

Traditionally, SCM uses the historical data on past customer orders, and information provided by sales teams and customers to forecast future orders for products and services. By analyzing historical data, and information from sales teams and customers regarding potential future orders, supply chain managers can identify a plurality of customer buying patterns including trends and seasonality, and adjust their forecasts for the latest information available on their customers' needs. Supply chain managers may also use other information such as data on industry trends, and economic indicators.

Forecasts made by an organization for its products and services are shared with its suppliers to plan their activities and orders. Forecasts and supply availability information are also shared with customers.

When products and services are ordered through contact centers and web sites besides the traditional channels such as sales teams and stores, organizations can improve the effectiveness of their plans by integrating their supply chain and contact center activities. This integration allows SCM to capture and use the information available at contact centers that affect future customer orders.

SUMMARY OF THE INVENTION

Organizations are taking advantage of the advances in communications and computer technologies to integrate their supply chains across their organizations, with their supplies, and even with the suppliers of their supplies. They also integrate their supply chains with their customers' to make supply chain data available to all partners.

Organizations may use one or more sales channels. New sales channels include contact centers, web sites and social media.

To purchase a product, customers either call contact numbers provided by the organization for their contact centers, go to the organization's web site to place an order either directly, or by email or chat with an agent and place an order. Thus, contact centers and web sites form direct sales channels.

Likewise, organizations providing services including repairs, maintenance, limousine and taxi, health care among others operate contact centers and web sites for taking orders for their services. Integrated services supply chain and contact center planning is also a critical requirement for these organizations.

Contact center employees ("agent") located at one or more center locations may also offer new products or services to customers who may call for information on other products, services or questions. Likewise, contact center agents may offer enhancements or upgrades to a product that a customer may be interested in purchasing. These activities are commonly referred as "cross selling" and "up-selling", respectively. The term "sales" is used in the remainder of this document to imply direct, cross and up-selling activities.

Contact centers include any channel or media by which agents are contacted by customers. For example, contacts received by phone, email, fax, chat, SMS messaging, web sites, social media originating queries or postings, etc. are handled by agents at contact centers. A plurality of contact centers involved in any type of sales activities is also referred to as a sales center ("sales center") in the description of the preferred embodiment.

Besides contact centers, an organization may also employ a plurality of traditional sales channels including stores, direct sales teams, and channel partners.

A sales center organization may offer a plurality of contact channels to their customers to contact the sales organization. These channels may include a plurality of phone numbers, email addresses, email, chat and SMS addresses, web sites, social media leads, etc. Each distinct phone number, email address, chat, SMS address, web site, social media channel, etc. served by a sales center may be identified as a contact group.

To plan their operations, supply chain managers need accurate forecasts of future orders generated by sales. For this, they typically rely on their past sales data, and information provided by their sales teams and customers among other information sources.

Like SCM, contact center managers forecast the number of contacts expected ("contact volume" or "NCO") and the time it would take to complete a contact ("average handling time" or "AHT") to schedule their agents.

Accordingly, in a first aspect of the present invention, a method for integrated demand forecasting for products and services is disclosed. The method comprises of the steps of: 1) forecasting NCO, AHT, and customer impatience for a plurality of contact channels such as telephone, web chat, email, fax ("contact groups"), and forecasting agent shrinkage for a plurality of agent groups, sales ratios with and without backup over a planning period, 2) scheduling agents to minimize the total costs including agent costs and lost sales costs, 3) predicting contacts handled together with the product sales forecasts based on agents scheduled, expected contact abandonments, supply chain product availability and sales ratios forecasted, 4) supplying the product sales forecasts ("product sales forecasts") to SCM, 5) combining the contact center based product sales forecasts with the sales forecasts from other sales channels for demand and supply planning accordingly, and 6) repeating steps (1-5) periodically (e.g. daily, weekly) to update the forecasts of NCO, AHT, customer impatience, sales ratios and product sales expected via contact centers, update the product sales forecasts for the supply chain, and adjusting staffing levels at contact centers.

In another aspect of the present invention, we disclose a non-transitory computer readable medium including a computer program store thereon when executed by a computer performs the steps of the method of the invention comprising of 1) forecasting NCO, AHT, and customer impatience for a plurality of contact channels such as telephone, web chat, email, fax, and forecasting agent shrinkage for a plurality of agent groups, sales ratios with and without backup over a planning period, 2) scheduling agents to minimize the total costs including agent costs and lost sales costs, 3) predicting contacts handled together with the product sales forecasts based on agents scheduled, expected contact abandonments, supply chain product availability and sales ratios forecasted, 4) supplying the product sales forecasts to SCM, 5) combining the contact center based product sales forecasts with the sales forecasts from other sales channels for demand and supply planning accordingly, and 6) repeating steps (1-5) periodically (e.g. daily, weekly) to update the forecasts of NCO, AHT, customer impatience, sales ratios and product sales expected via contact centers, update the product sales forecasts for the supply chain, and adjusting staffing levels at contact centers.

BRIEF DESCRIPTION OF THE DRAWINGS

The invention will be better understood by an examination of the following Detailed Description of the Preferred Embodiment, together with the accompanying drawings, in which:

FIG. 4. shows performance prediction data and product sales forecasts.

DETAILED DESCRIPTION OF THE PREFERRED EMBODIMENT

One of the most critical steps in supply chain planning and management is product sales forecasting. Accurate sales forecasts for product orders are essential for efficient supply chain management.

Product sales forecasts are developed over a planning time window ("planning period") in the future and updated periodically (e.g. daily, weekly) as time passes. A planning period is a contagious period of one or more time units in the future. For example, it may be 5 weeks into the future. Product sales forecasts predict the number of units of different products that are expected to be ordered by customers in each time unit over the planning period.

Product sales forecasts are developed with the collaboration of a number of functions within an organization. For example, these functions may include the finance, marketing, and product management units. Product sales forecasts developed by demand planning and forecasting 250 may be updated periodically. For example, product sales forecasts may be updated daily or weekly by repeating the forecasting process after the latest orders are added to the sales history. These forecasts may also be updated several times during the course of a day.

A supply chain produces and delivers products and services to customers. In the remainder of this document, the term "product" is used for both types of output. The method and system of the invention are used for integrated supply chain and contact center planning for both product and services.

Products and services produced by a supply chain may be classified based on features, functions, quality, model, etc. offered into distinct products. Thus, a supply chain produces and delivers a plurality of products.

Product sales forecasts may be developed for each of a plurality of distinct products. In another embodiment, forecasts may be developed for product groups each of which may consist of a plurality of distinct products.

Figure 1:
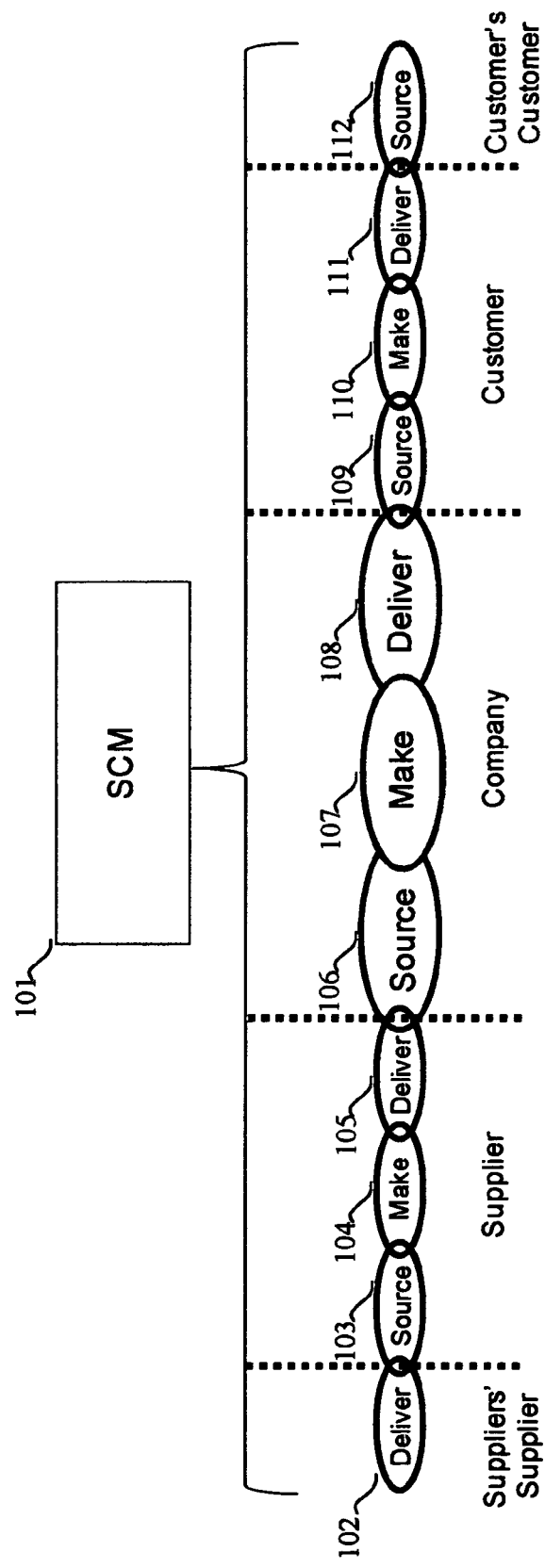
FIG. 1. shows a high-level process architecture of an integrated supply chain.

An integrated supply chain connects not only an organization's own processes and systems but also customers' and suppliers' processes as shown FIG. 1. An organization's supply chain carries out activities such as sourcing 106, making 107 and delivery 108. In an integrated supply chain, an organization's supply chain extends to its suppliers' to provide information and plan collaboratively their sourcing 103, making 104 and delivery 105 processes. Likewise, if products of the organization are inputs to its customers' supply chains, customers' supply chains and sourcing 109, making 110 and delivery 111 processes are provided information and planned collaboratively.

Product sales forecasts are used for planning supplies, inventory, capacity, distribution and other activities throughout a supply chain. In an integrated supply chain, they are also shared with partners including customers and suppliers of an organization. Inaccurate forecasts result in higher costs either due to lost sales and low customer satisfaction when actual customer orders exceed the product sales forecasts, or idle capacity and excessive inventories when actual customer orders are less than the product sales forecasts. Thus, accurate product sales forecasts are essential for an efficient and competitive supply chain.

Prior to the availability of contact centers and interne, customers traditionally placed their orders via sales teams, stores, distributors, electronic data interchange ("EDI") links, etc. These sales channels are still being used by most organizations to receive orders from their customers.

Figure 2:
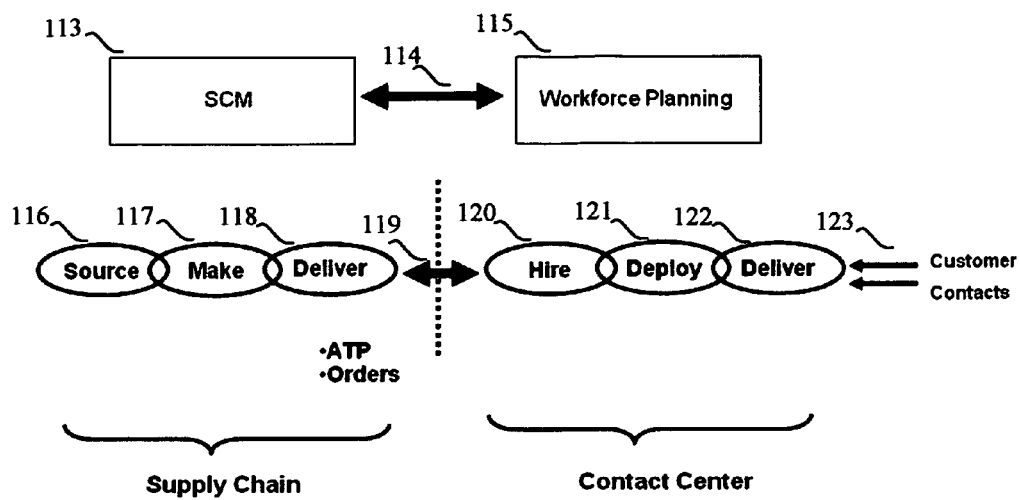
FIG. 2. shows a high-level architecture for the preferred embodiment of an integrated supply chain and contact centers.
Figure 3:
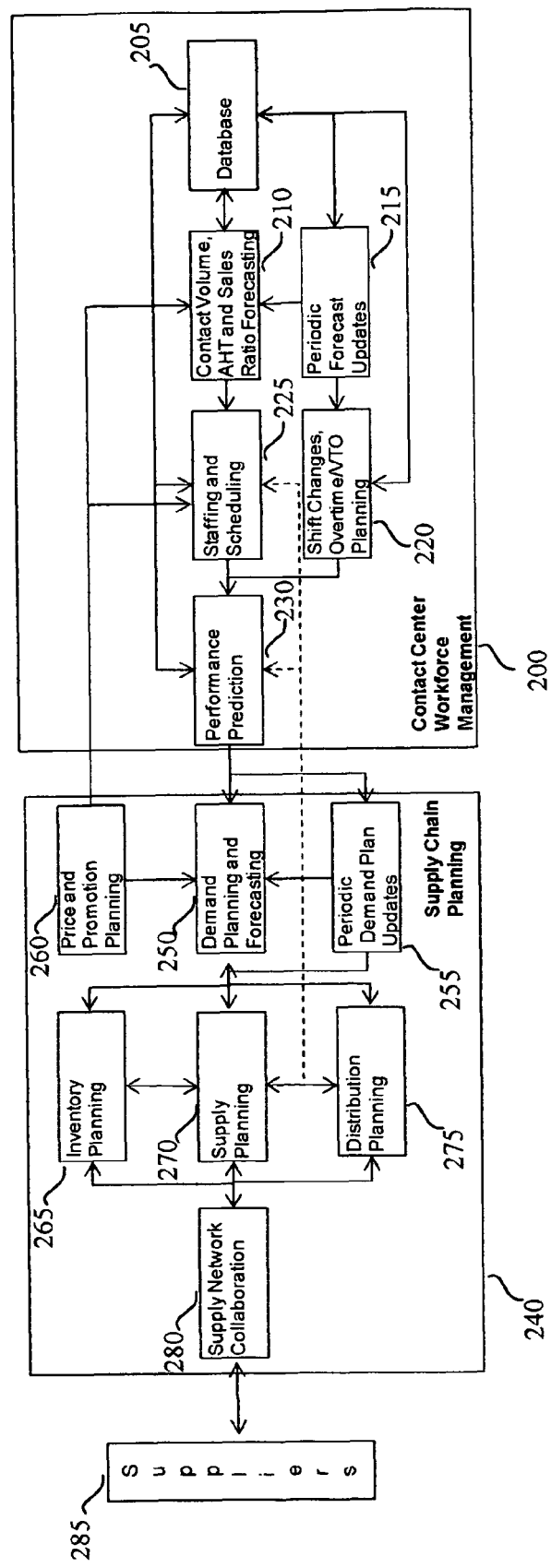
FIG. 3. shows an integrated contact center workforce management and supply chain planning process architecture.

If an organization is providing contact center and web-based sales channels, customers may also contact its contact centers or web sites as shown in FIG. 2. to place orders for products. Customers may reach contact centers by placing calls, sending emails or using other means. Customers may also go to the organization's web site to place orders directly from the site, or interact with its sales center using chat or SMS messages to order products. Most organizations provide a plurality of interaction channels to their customers to place orders.

Similar to an organization's supply chain carrying out the activities sourcing, making and delivering, a sales center providing a plurality of contact channels including phone, email, chat, SMS, web site, etc. hires 120, trains and deploys 121, and delivers 122 sales services to its customers.

Customer contacts are served by agents at a sales center and orders received are passed to supply chain for manufacturing and delivery planning using electronic, manual or other means 119. In the preferred embodiment, electronic, manual or other means between a sales center and supply chain management are also used to provide product and inventory availability information ("available to promise" or "ATP") to the sales center agents to inform customers about availability and delivery schedules for their orders.

A sales center's workforce management ("WFM") group forecasts expected customer contact volume NCO and AHT ("traffic forecasts") for each contact group over a planning period. Traffic forecasts may be based on the historical data including historical contact volumes, historical AHT, historical product sales, price, promotions planned and other factors affecting NCO, AHT and product sales and their forecasts.

For traffic forecasting, it is customary to divide the days over a planning period in to intervals. An interval ("interval") may be, for example, 15 or 30 minutes long. For each such interval over the planning period, NCO and AHT forecasts are generated by forecasting process 210, and updated 215 periodically.

At a sales center, naturally, not every contact results in an order. A sales ratio ("sales ratio") specifies the percentage of contacts received in an interval that results in customers ordering a product. Using historical sales data, future plans and forecasts for factors that may affect product sales, sales ratios for a plurality of products produced by a supply chain for each contact group and each interval over the planning period are forecasted 210 and updated 215 by the WFM group.

In one embodiment, besides traffic forecasts, forecasting process 210 may also generate agent shrinkage forecasts ("shrinkage") for each of a plurality of agent groups. Agent shrinkage forecasts predict the expected percentage of the scheduled agents that will not be available to work in different intervals. Agent shrinkage may be caused by a plurality of reasons including sickness, request for time off, training, meeting, relief or lunch breaks, personal needs, etc.

In one embodiment of the invention, historical data in database 205 may be analyzed, and forecasts 210 may be generated and updated 215 by using a forecasting method that can model two or more seasonal patterns. U.S. patent application Ser. No. 11/446,711 outlines a method for forecasting when a time series exhibits two or more seasonal patterns.

In yet another embodiment of the invention, forecasts 210 and updates 215 may be received from another system, generated manually, and may or may not use historical data or a time series forecasting method.

Performance targets in a sales centers may be set as a service level ("SL") and may be expressed, for example, as 80% of customers served in 20 seconds of receipt of their contact. Other service targets may be based on the maximum abandonment percentage ("Ab %"), maximum time to service ("average speed of answer" or "ASA"), or maximum percent of agent time occupied with work ("occupancy"). This type of service targets are referred to as "productivity-based targets".

A performance target is set for every contact group available to customers. In one embodiment of the invention, performance target selected for a contact group may be an productivity-based target.

In the preferred embodiment, performance target for a contact group used for sales may be specified as to minimize total costs, maximize profits or maximize sales. This type performance targets are called revenue-based targets ("revenue-based target").

Given the NCO, AHT and shrinkage forecasts, one of the critical steps in managing sales centers is scheduling staffing levels to meet the performance targets specified for contact groups. If the number of agents scheduled and available to serve (referred to as "agents on duty" or "AOD") exceeds the staffing levels necessary to meet the performance targets, agents will be idle. Idle agents result in higher agent costs. If AOD is less than necessary staffing levels, on the other hand, waiting times and the number of customers waiting will be higher than desired. As a result, some customers may abandon their contacts ("abandonment"). This results in poor customer satisfaction and loss of sales at sales centers. Thus, agent schedules affect orders received and costs at sales centers.

Forecasts generated 210 and performance targets specified for a plurality of contact groups are used for determining agent schedules over the planning period. Steps involved in scheduling agents at a sales center organization depend on its contact routing system.

A sales center may have skills-based or non-skills based routing. In non-skills based routing, agents are assigned to handle contacts of one contact group while each contact group is assigned a unique agent group to handle its contacts. For example, all order calls from a contact group for a particular product are routed to and answered exclusively by a group of agents who do not answer contacts from any other contact group.

In skill-based routing, agents may have one or more skills to handle contacts from different contact groups. Contacts from different contact groups are routed to agents based on their skills, preferences and other routing rules. Thus, one agent may handle contacts from one or more contact groups.

In one embodiment, when the performance targets specified for contact groups in a sales center organization with non-skills based routing are productivity-based targets, required staffing levels for staffing and scheduling step 225 are generated using the well known staffing models such as Erlang C or the Palm model (Palm 1957), and NCO, AHT agent shrinkage forecasts. While Erlang C model assumes no customer abandonments, the Palm model takes customer abandonments into staffing level calculations. In another embodiment, simulation, regression or a workload based staffing model obtaining the required staffing levels by multiplying NCO forecasts by AHT forecasts may be used to determine the required staffing levels.

An agent's schedule specifies work and off days, daily work start and end times, and daily relief and lunch break start and end times for work days. Agent schedules are optimized 225 to match the required staffing levels as closely as possible, given the agent work availability and agent skills. Given the required staffing levels for a plurality of contact groups with productivity-based targets in a non-skills based routing environment, a method and system for agent schedule optimization are described in U.S. Pat. No. 7,725,339

When revenue-based performance targets such as minimizing the total costs are specified for one or more contact groups in a sales canter organization with non-skills based routing, in the preferred embodiment, required staffing levels are determined using the permanently abandoned contacts and the cost of resulting lost sales, agent costs, facility costs, and communication costs. A method and system for determining the required staffing levels and scheduling agents at a sales center organization with non-skills based routing and revenue-based targets are described in U.S. patent application Ser. No. 13/066,774. As described in the same U.S. patent application, a sales center organization may have both contact groups used by customers to order products and services, and contact groups used by customers to obtain services that are not for sale. Scheduling agents at contact centers offering both types of contact groups is described in the same U.S. patent application.

In skills-based routing, contacts from contact groups are routed to agents based on their skills, preferences and routing rules. In this type of routing environment, an agent may have skills to serve contacts from one or more contact groups. A group of agents with the same skills, preferences and routing rules (e.g. longest idle, highest skill) is called a skill group ("skill group"). When contacts are routed to agents using skills-based routing, in one embodiment, staffing levels and schedules 225 may be determined using a Linear Programming Model and discrete event simulation based optimization approach. A method and system using an Integer Programming Model and optimization algorithm described in U.S. Pat. No. 7,725,339, and discrete event simulation are described in U.S. patent application Ser. No. 12/584,210 for contact groups with productivity-based targets.

Like in the case of non-skills based routing case, when contact groups are assigned revenue-based targets such as the minimum total costs in skills-based routing, in one embodiment of the invention, staffing and agent schedules are determined using the permanently abandoned contacts, and the cost of resulting lost sales, agent costs, facility costs and communication costs. A method and system for agent scheduling in skills-based routing with one or more contact groups with productivity-based targets, and a plurality of other contact groups with revenue-based targets are described in Ser. No. 13/068,274. When revenue-based targets are specified for contact groups at a sales center organization, the method of the present invention determines the agent schedules to best meet the targets.

In yet another embodiment of the invention, staffing levels and schedules 225 in both skills-base and non-skills based routing may be provided by another system such as a database, software or may be manually generated.

In one embodiment, the method and system of the invention determines the expected abandonments percentages for AOD levels for contact groups in a non-skills based and a skills-based sales center by simulating the routing rules, forecasts and agent schedules.

In another embodiment, the method of the invention may use other methods such as regression or manual means to determine the expected abandonment percentages.

When a customer abandons a contact, the customer may or may not contact back. When customer contact-backs exist, contact-back rates in percentage are estimated from the historical customer contact records. For example, many telephone service providers offer caller identification services. In another example, email addresses may be matched for repeated inquiries, or ip addresses for chat requests. This and other means may be used to estimate customer contact-back rates. Customer contact-back rates may vary by a plurality of factors including geographical region, the time of day, week, month, year, product, models or features, etc.

When a customer abandons contact and never contacts regarding the product in question for a purchase in that particular instance, that contact is permanently abandoned. Permanently abandoned contacts result in lost sales and profit. Customer contact-back rates are used in determining the permanently abandoned contacts in each interval over the planning period.

In the preferred embodiment, forecasts 210 are updated periodically. Forecast updates 215 may be carried out daily, weekly or even the course of an operating day a plurality of times.

Forecast updates 215 may be used to determine changes to a plurality of agent schedules to better serve the updated forecasts. Schedule changes, overtime and volunteer time off ("VTO") planning 220 may include, for example, rescheduling of agent breaks, changing agent work days, daily start times, scheduling overtime or VTO for one or more agents, or any combination of these changes. Agent schedules are optimized 220 to match the required staffing levels based on the updated forecasts 215 as closely as possible, given the agent work availability and agent skills.

Agent schedules 225 and schedule changes 220 are analyzed together with the updated forecasts 215 in performance prediction 230. Performance prediction 230 provides a plurality of performance information based on the traffic forecasts, agent schedules, agent shrinkage forecasts, sales ratios and a plurality of other assumptions made in determining the required staffing levels and agent schedules. It also generates forecasts of product orders in each interval in the planning period.

In one embodiment, Performance prediction 230 may use a simulation-based staffing model to develop performance information. In another embodiment, performance prediction 230 may use a staffing model such as the Palm model (Palm, 1957). In yet another embodiment, it may use a regression model or other means.

For each interval over the planning period, information generated by performance prediction 230 include expected AOD after shrinkage, number of contacts expected to be answered ("number of contacts handled" or "NCH"), number of contacts expected to be abandoned before answered by agents, percentage of agents' time occupied by answering contacts, average speed of answer for contacts answered. FIG. 4. shows sample predictions provided by performance prediction 230.

Figure 5:
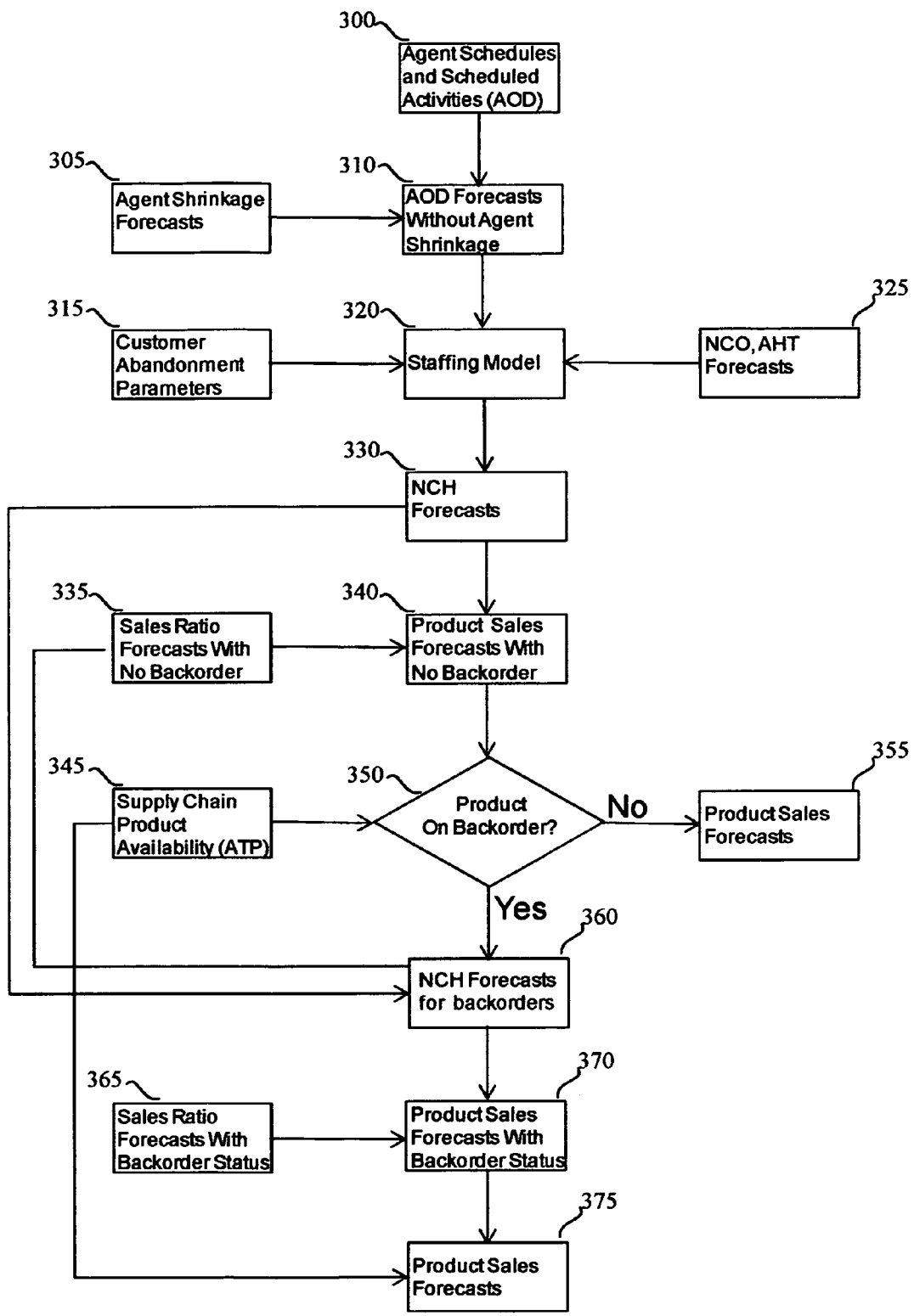
FIG. 5. shows a flowchart for the product sales forecast generation.

Performance prediction performs a number of steps to generate product sales forecasts. In one embodiment, performance prediction follows the flowchart shown in FIG. 5 to generate the information shown in FIG. 4. It takes the agent schedules and scheduled activities 225, and schedule changes 220 to determine AOD 300 for each interval. Next it combines AOD 300 value for each interval with the agent shrinkage forecasts 305 for that interval to generate AOD forecasts without agent shrinkage 310. That is, AOD without including agents who will not be available to work due to shrinkage. AOD forecasts without agent shrinkage 310 in each interval is the net staffing level that is expected to serve customers contacting for products.

AOD forecasts without agent shrinkage 310, customer abandonment parameters 315 such as the historical abandonment % and associated average waiting time to capture customer impatience, and NCO and AHT forecasts 325 are analyzed by a staffing models 320 to generate NCH forecasts 330.

NCH forecasts 330 are combined with the sales ratio forecasts with no backorder ("backorder") 335 to generate product sales forecasts with no backorder 340.

In the preferred embodiment of the invention, supply chain product availability 345 is compared with the product sales forecasts with no backorder 340 in 350. If supply chain product availability ATP 345 is sufficient to fulfill product sales forecasts with no backorder 340, product sales forecasts are provided to SCM demand planning and forecasting 250.

If product sales forecasts with no backorder exceed supply chain product availability ATP 345, it is necessary to modify product sales forecasts to increase forecast accuracy. In the preferred embodiment, supply chain product availability ATP 345 determines the forecasts of products to be sold without backorder. Once these units are sold out, there may still be customers contacting to order products when NCH based product sales forecasts with non-back order 340 exceeds supply chain product availability ATP 345. In this case, supply chain product availability ATP 345 is combined with sales ratio with no backorders to determine the portion of NCH forecasts 330 that will generate orders for supply chain product availability 345. The difference between the NCH forecasts 330 and the portion of NCH that is estimated to generate orders for supply chain product availability ATP 345 is NCH for backorders 360. Product sales forecasts 375 are obtained by combining product availability 345 and backorders expected based on NCH forecasts for backorders 360 and sales ratio forecasts with backorder status 365.

When product availability is limited, customers may still be able to place orders with backorder status to be delivered when the product becomes available. When customers are offered to place orders on backorder, they may or may not place their orders. Thus, sales ratios may be affected by the backorder status. When backorder status is offered to customers ordering products, sales ratios are re-forecasted to include its effects on sales.

In the preferred embodiment, product sales forecasts generated and updated by performance prediction 230 are provided to demand planning and forecasting 250, and periodic demand plan updates 255.

Demand planning and forecasting 250 combines product sales forecasts 230 with product sales forecasts from other sales channels to develop a combined product sales forecast for each product and model.

Combined product sales forecast from demand planning and forecasting 230 are inputs to inventory planning 265, supply planning 270, and distribution planning 275 processes of the supply chain management system 240. Inventory planning 265 determines the inventory needs including safety stocks to be carried to meet orders when orders exceed the combined product sales forecasts. Given the combined product sales forecasts, inventory targets and required supplies to meet them, supply planning 270 determines the quantities to be supplied by each supplier. Distribution planning 275 coordinates the inbound as well as outbound delivery logistics.

Having thus described our invention, what we claim as new and desire to secure by Letters Patents is as follows:

1. A computer implemented method for integrated supply chain and contact center management for products and services sold by a plurality of contact center agents located at a plurality of sales centers and serving customer contacts received through a plurality of contact groups, comprising the steps of:
   (a) acquiring, via a computer, a planning period, and contact groups served;
   (b) acquiring, via the computer, performance targets
   (c) acquiring, via the computer, agents' skills and a type of contact-to-agent routing system used for routing contacts to agents;
   (d) acquiring, via the computer, agent scheduling rules including one or more of a number of work and non-work days, a number of consecutive days and weekend days off, daily start times, shift lengths, a number and duration of daily breaks for each shift length, an earliest break start times and break slack for each break, weekly cost of assigning an agent to a schedule, wages, benefits, facility costs per hour, and work availability for each agent;
   (e) acquiring, via the computer, a plurality of forecasts including forecasts of contact volume, average handling time, sales ratios with no backorder, and sales ratio with backorder for products and services sold during the planning period for the contact groups served;
   (f) acquiring, via the computer, connect costs per minute for each contact group of the contact groups served, and lost sales costs per unit of lost order due to permanently abandoned contacts for each of the products and the services sold during the planning period for the contact groups served;
   (g) generating, via the computer, required staffing levels using a non-skills based staffing method to meet performance targets for the contact groups served based on the plurality of forecasts acquired in step (e) over the planning period when the contact-to-agent routing system is a non-skills based system, and then scheduling a plurality of agents that most closely meet the performance targets over the planning period for the contact groups served;

(h) generating, via the computer, a plurality of skilled agent schedules using a skills based staffing method to most closely meet the performance targets specified for the contact groups served with the forecasts acquired in step (e) over the planning period when the contact-to-agent routing system is a skills-based system;

(i) acquiring, via the computer, forecasts of supply chain product and service availability;

(j) generating, via the computer, sales forecasts for agents scheduled in step (g), step (h) or both step (g) and step (h) using the plurality of forecasts acquired in step (e), the forecasts of supply chain product and service availability acquired in step (i), and the sales ratios with and without backorder acquired in step (e);

(k) inputting, via the computer, the sales forecasts generated in step (j) into a demand planning and forecasting model of a supply chain management system;

(l) combining, via the computer, the sales with one or more sales forecasts received from a plurality of other sales channels to generate combined sales forecasts for the supply chain; and (m) updating, via the computer, the demand planning and forecasting model based on the combined forecast produced in step (l).

2. The method of claim 1, wherein the required staffing level for a contact group of the contact groups served is determined as the staffing level minimizing the total costs of agents, lost sales due to customer abandonments, communication and facility over the planning period when the contact-to-agent routing system is non-skills based.

3. The method of claim 2, wherein the plurality of skilled agents are scheduled to minimize the total costs of agents, lost sales due to customer abandonments, communication and facility for each contact group of the contact groups served.

4. The method of claim 1, wherein the plurality of skilled agents are scheduled to minimize the total costs of agents, lost sales due to customer abandonments, communication and facility costs for contact groups of the contact groups served when the contact-to-agent routing system is skills-based.

5. The method of claim 1, wherein, consistent with the contact-to-agent routing system, one of the non-skills based or skills based staffing methods is used to determine expected service levels, average speed of answer, number of contacts handled and customer contact abandonments for the agent schedules and resulting scheduled staffing levels for the forecasted contact volume, and average handling time.

6. The method of claim 1, wherein, consistent with the contact-to-agent routing system, one of the non-skills based or skills based staffing methods is used to determine expected sales in units using the expected number of contacts handled and abandonments for the agent schedules and resulting scheduled staffing levels with contact volume, average handling time, sales ratios with no backorder, and sales ratio with backorder for products and services sold, and contact groups used by customers to place orders for the products and services sold over the planning period.

7. A non-transitory computer readable medium including a computer program stored thereon when executed by a computer performs a method of integrated contact center and supply chain planning comprising of:

(a) acquiring, via a computer, a planning period, and contact groups served;

(b) acquiring, via the computer, performance targets (c) acquiring, via the computer, agents' skills and a type of contact-to-agent routing system used for routing contacts to agents;

(d) acquiring, via the computer, agent scheduling rules including one or more of a number of work and non-work days, a number of consecutive days and weekend days off, daily start times, shift lengths, a number and duration of daily breaks for each shift length, an earliest break start times and break slack for each break, weekly cost of assigning an agent to a schedule, wages, benefits, facility costs per hour, and work availability for each agent;

(e) acquiring, via the computer, a plurality of forecasts including forecasts of contact volume, average handling time, sales ratios with no backorder, and sales ratio with backorder for products and services sold during the planning period for the contact groups served;

(f) acquiring, via the computer, connect costs per minute for each contact group of the contact groups served, and lost sales costs per unit of lost order due to permanently abandoned contacts for each of the products and the services sold during the planning period for the contact groups served;

(g) generating, via the computer, required staffing levels using a non-skills based staffing method to meet performance targets for the contact groups served based on the plurality of forecasts acquired in step (e) over the planning period when the contact-to-agent routing system is a non-skills based system, and then scheduling a plurality of agents that most closely meet the performance targets over the planning period for the contact groups served;

(h) generating, via the computer, a plurality of skilled agent schedules using a skills based staffing method to most closely meet the performance targets specified for the contact groups served with the forecasts acquired in step (e) over the planning period when the contact-to-agent routing system is a skills-based system;

(i) acquiring, via the computer, forecasts of supply chain product and service availability;

(j) generating, via the computer, sales forecasts for agents scheduled in step (g), step (h) or both step (g) and step (h) using the plurality of forecasts acquired in step (e), the forecasts of supply chain product and service availability acquired in step (i), and the sales ratios with and without backorder acquired in step (e);

(k) inputting, via the computer, the sales forecasts generated in step (j) into a demand planning and forecasting model of a supply chain management system;

(l) combining, via the computer, the sales with one or more sales forecasts received from a plurality of other sales channels to generate combined sales forecasts for the supply chain; and (m) updating, via the computer, the demand planning and forecasting model based on the combined forecast produced in step (l).

* * * * *